(12) United States Patent
Ozawa

(10) Patent No.: US 11,988,177 B2
(45) Date of Patent: May 21, 2024

(54) EXHAUST SYSTEM

(71) Applicant: SUBARU CORPORATION, Tokyo (JP)

(72) Inventor: Tomoya Ozawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 18/138,344

(22) Filed: Apr. 24, 2023

(65) Prior Publication Data
US 2023/0366365 A1 Nov. 16, 2023

(30) Foreign Application Priority Data

May 11, 2022 (JP) .................... 2022-078397

(51) Int. Cl.
| | |
|---|---|
| F02M 26/10 | (2016.01) |
| F02B 37/02 | (2006.01) |
| F02B 37/22 | (2006.01) |
| F02M 26/06 | (2016.01) |
| F02M 26/34 | (2016.01) |
| F02M 26/47 | (2016.01) |
| F02B 39/04 | (2006.01) |

(52) U.S. Cl.
CPC ............ *F02M 26/10* (2016.02); *F02B 37/02* (2013.01); *F02B 37/22* (2013.01); *F02M 26/06* (2016.02); *F02M 26/34* (2016.02); *F02M 26/47* (2016.02); *F02B 39/04* (2013.01)

(58) Field of Classification Search
CPC ........ F02M 26/10; F02M 26/06; F02M 26/34; F02M 26/47; F02B 37/02; F02B 37/22; F02B 39/04

USPC .......................................................... 60/602
See application file for complete search history.

(56) References Cited

U.S. PATENT DOCUMENTS

| | | | |
|---|---|---|---|
| 9,303,557 B2* | 4/2016 | Ulrey .................. | F02D 41/0007 |
| 10,774,760 B2* | 9/2020 | Dudar .................... | F02B 37/16 |
| 11,047,322 B2* | 6/2021 | Ulrey .................. | F02D 41/0052 |

(Continued)

FOREIGN PATENT DOCUMENTS

| | | | | |
|---|---|---|---|---|
| JP | 2018-157264 A | 10/2018 | | |
| JP | 6725602 B2 | 7/2020 | | |
| WO | WO-2020210282 A1 * | 10/2020 | ............. | F01N 3/021 |

*Primary Examiner* — J. Todd Newton
(74) *Attorney, Agent, or Firm* — MCGINN I.P. LAW GROUP, PLLC

(57) ABSTRACT

An exhaust system includes a supercharger, a first communication path, a negative pressure generator, and an exhaust sensor. The supercharger includes a turbine and compressor. The turbine is provided in an exhaust pipe of an engine. The compressor is provided in an intake pipe and coupled to the turbine by a shaft. The supercharger supercharges intake air using energy of exhaust air. The first communication path communicates with the exhaust pipe on a downstream side of the turbine and communicates with the intake pipe on an upstream side of the compressor. The exhaust pipe and the intake pipe communicate through the first communication path. The negative pressure generator is interposed in the first communication path and generates a negative pressure. The exhaust sensor is provided in the first communication path between a location where the first communication path is coupled to the exhaust pipe and the negative pressure generator.

20 Claims, 3 Drawing Sheets

(56) References Cited

U.S. PATENT DOCUMENTS

| | | | |
|---|---|---|---|
| 2017/0328263 A1* | 11/2017 | Uhrich | F02M 26/06 |
| 2018/0270029 A1 | 9/2018 | Matsuo et al. | |
| 2020/0063696 A1 | 2/2020 | Kugo et al. | |
| 2022/0065147 A1* | 3/2022 | Sugaya | F01N 13/1805 |
| 2022/0116164 A1 | 4/2022 | Matsuo et al. | |

* cited by examiner

EXHAUST SYSTEM

CROSS-REFERENCE TO RELATED APPLICATIONS

The present application claims priority from Japanese Patent Application No. 2022-078397 filed on May 11, 2022, the entire contents of which are hereby incorporated by reference.

BACKGROUND

The disclosure relates to an exhaust system.

An exhaust sensor, e.g., a linear air-fuel ratio (LAF) sensor, an $O_2$ sensor, and a $NO_x$ sensor is installed in an exhaust pipe (which may be referred to as an exhaust path) that emits exhaust air of an engine (refer to, for example, Japanese Unexamined Patent Application Publication (JP-A) No. 2018-157264). The LAF sensor detects a combustion air-fuel ratio from an oxygen concentration and an unburned gas concentration in the exhaust air (exhaust gas). The $O_2$ sensor detects the oxygen concentration in the exhaust air by being turned on or off. Furthermore, the $NO_x$ sensor detects the $NO_x$ concentration in the exhaust air.

SUMMARY

An aspect of the disclosure provides an exhaust system including a supercharger, a first communication path, a negative pressure generator, and an exhaust sensor. The supercharger includes a turbine and compressor. The turbine is provided in an exhaust pipe of an engine. The compressor is provided in an intake pipe of the engine. The compressor is coupled to the turbine by a shaft. The supercharger is configured to supercharge intake air using energy of exhaust air. The first communication path communicates with the exhaust pipe on a downstream side of the turbine. The first communication path communicates with the intake pipe on an upstream side of the compressor. The exhaust pipe and the intake pipe communicate with each other through the first communication path. The negative pressure generator is interposed in the first communication path. The negative pressure generator is configured to generate a negative pressure. The exhaust sensor is provided in the first communication path between the negative pressure generator and a location where the first communication path is coupled to the exhaust pipe.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

The exhaust air of an engine contains a large amount of water (water vapor) generated by combustion of gasoline or the like. Owing to this, the water (water vapor) in the exhaust air is condensed into condensed water in an exhaust pipe (exhaust path).

Meanwhile, as a sensor element of the exhaust sensor described above, zirconia, for example, activated in a high-temperature state of several hundred degrees centigrade is used. Owing to this, when the sensor element in the high-temperature state is exposed to (submerged in) the condensed water, the sensor element is rapidly cooled and may crack.

It is desirable to provide an exhaust system that can prevent a sensor element from being exposed to condensed water and prevent the sensor element from cracking due to rapid cooling without compromising a sensing performance of an exhaust sensor.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
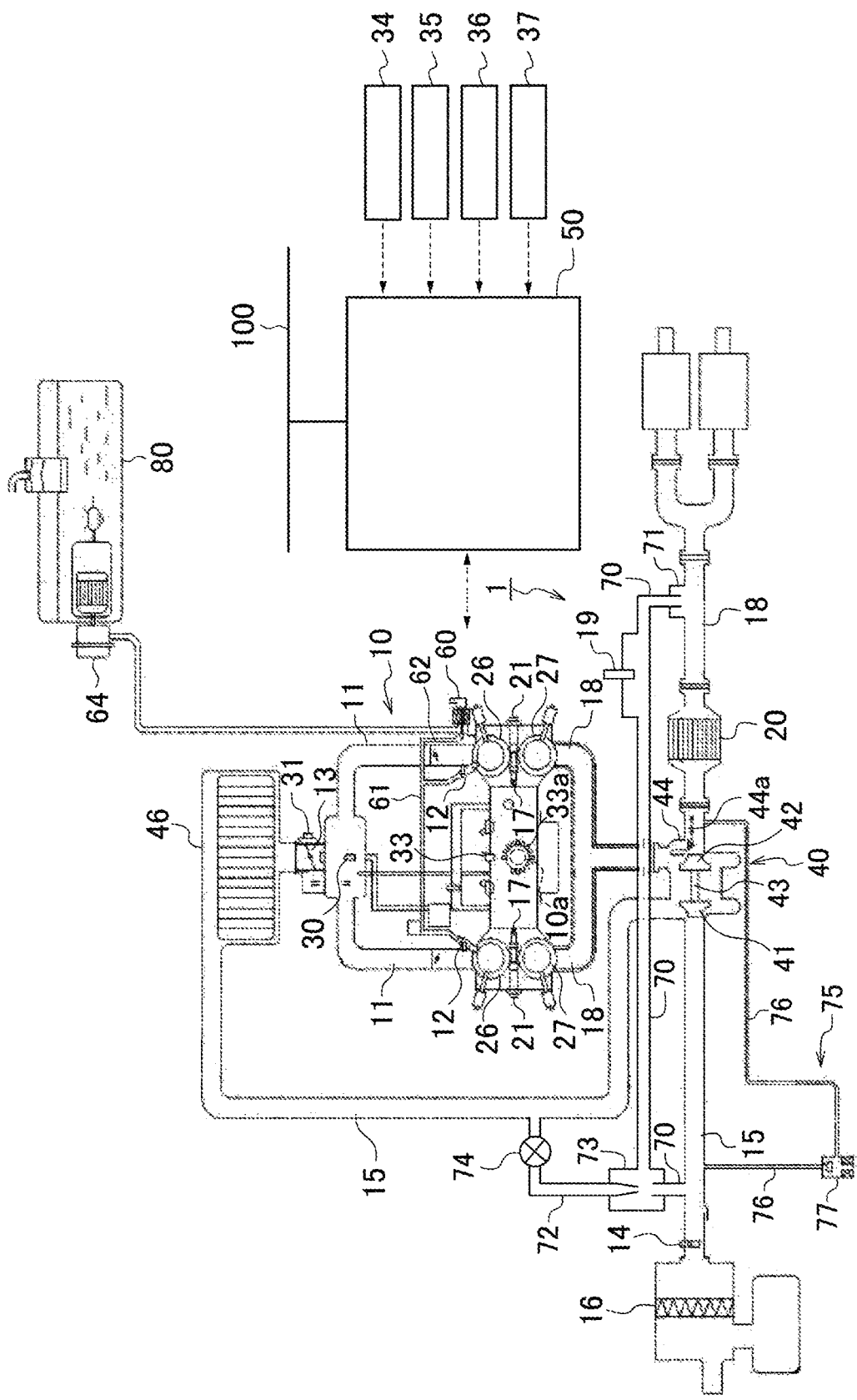
FIG. 1 illustrates configurations of an exhaust system according to an embodiment and an engine to which the exhaust system is applied.

An exhaust system 1 according to the embodiment will be described with reference to FIG. 1. FIG. 1 illustrates configurations of the exhaust system 1 and an engine 10 to which the exhaust system 1 is applied.

The engine 10 is, for example, a horizontally opposed four-cylinder gasoline engine with a supercharger such as a turbocharger 40. The engine 10 is also a cylinder direct-injection engine (direct-injection gasoline engine) that directly injects fuel into cylinders. A manual transmission (not illustrated) is coupled to an output shaft (crankshaft) 10a of the engine 10 via, for example, a dry clutch. The manual transmission changes a gear in response to manual operation of a driver (who drives a vehicle) to convert and output a torque (driving force) from the engine 10. It is noted that the transmission might be an automatic transmission (step AT), a continuously variable transmission (CVT), or the like.

In an intake pipe (intake path) 15 of the engine 10, an air cleaner 16, an airflow meter 14, the turbocharger 40, an intercooler 46, an electronically controlled throttle valve (hereinafter, also simply "throttle valve") 13, and the like are disposed from an upstream side.

The turbocharger 40 is a supercharger that is disposed between the intake pipe 15 and an exhaust pipe (exhaust path) 18 and performs supercharging. The turbocharger 40 includes a turbine 42 provided in the exhaust pipe 18 and a compressor 41 provided in the intake pipe 15 and coupled to the turbine 42 by a rotational shaft 43. The turbocharger 40 drives the turbine 42 by energy of exhaust air to allow the coaxial compressor 41 to compress the air.

The intercooler 46 cools the intake air compressed and heated by the turbocharger 40 (compressor 41) by heat exchange. The throttle valve 13 that regulates an amount of intake air is disposed downstream of the intercooler 46.

In the engine 10, the air suctioned from the air cleaner 16 and supercharged in the turbocharger 40 is throttled by the throttle valve 13, passed through an intake manifold 11, and delivered into cylinders formed in the engine 10. Here, the airflow meter 14 disposed between the air cleaner 16 and the throttle valve 13 detects the amount of air suctioned from the air cleaner 16 (amount of air delivered into the engine 10). Furthermore, a vacuum sensor 30 that detects an internal pressure (intake manifold pressure) of the intake manifold 11 is provided in a collector member (surge tank) that configures the intake manifold 11. Moreover, a throttle opening degree sensor 31 that detects an opening degree of the throttle valve 13 is provided on the throttle valve 13.

An intake port and an exhaust port are formed in a cylinder head per cylinder. The intake port and the exhaust port are provided with an intake valve and an exhaust valve opening and closing the intake port and the exhaust port, respectively. A variable valve timing mechanism 26 is disposed between an intake cam shaft and an intake cam pulley driving the intake valve. The variable valve timing mechanism 26 relatively rotates the intake cam pulley and the intake cam shaft to continuously change a rotational phase (displacement angle) of the intake cam shaft with respect to the crankshaft 10*a* and advances or delays valve timing (opening and closing timing) of the intake valve. This variable valve timing mechanism 26 variably sets the opening and closing timing of the intake valve depending on an engine operating state.

Likewise, a variable valve timing mechanism 27 is disposed between an exhaust cam shaft and an exhaust cam pulley. The variable valve timing mechanism 27 relatively rotates the exhaust cam pulley and the exhaust cam shaft to continuously change a rotational phase (displacement angle) of the exhaust cam shaft with respect to the crankshaft 10*a* and advances or delays valve timing (opening and closing timing) of the exhaust valve. This variable valve timing mechanism 27 variably sets the opening and closing timing of the exhaust valve depending on the engine operating state.

An injector 12 is mounted in each cylinder of the engine 10 to inject fuel into the cylinder. The injector 12 directly injects the fuel pressurized by a high-pressure fuel pump 60 into a combustion chamber of each cylinder.

The injector 12 is coupled to a delivery pipe 61. The delivery pipe 61 distributes the fuel pressurized by and delivered from the high-pressure fuel pump 60 via a fuel pipe 62 to the injectors 12. The high-pressure fuel pump 60 boosts the fuel suctioned by a feed pump (low-pressure fuel pump) 64 from a fuel tank 80 to a high pressure (e.g., 8 to 13 MPa) depending on the operating state and supplies the boosted fuel to the delivery pipe 61. It is noted that a pump driven by a camshaft of the engine 10 is used as the high-pressure fuel pump 60 in the present embodiment.

An ignition plug 17 that ignites an air-fuel mixture and an ignitor-mounted coil 21 that applies a high voltage to the ignition plug 17 are mounted to the cylinder head of each cylinder. In each cylinder of the engine 10, the air-fuel mixture that is the intake air and the fuel injected by the injector 12 is ignited by the ignition plug 17 and burned. After burning, exhaust air (exhaust gas) is emitted through the exhaust pipe 18.

The turbine 42 that configures the turbocharger 40 is provided downstream of an assembly member of the exhaust pipe (exhaust path) 18. The turbocharger 40 is provided with a wastegate 44 that bypasses the exhaust air from an inlet side to an outlet side of the turbine 42, and a wastegate valve 44*a* that opens and closes the wastegate 44. The wastegate valve 44*a* regulates a supercharging pressure with an opening degree of the wastegate valve 44*a* controlled by an engine control unit (hereinafter, "ECU") 50.

An exhaust emission control catalyst (CAT) 20 is disposed downstream of the turbine 42. For example, a lean $NO_x$ trap (LNT) catalyst or a three-way catalyst is used as the exhaust emission control catalyst 20. The LNT catalyst traps (occludes) nitrogen oxide ($NO_x$) during lean burn operation and makes an air-fuel ratio rich causes (rich spike) at predetermined timing, reducing the trapped (occluded) $NO_x$ to harmless nitrogen ($N_2$). In addition, the three-way catalyst oxidizes hydrocarbon (HC) and carbon monoxide (CO) and reduces nitrogen oxide ($NO_x$) in the exhaust air simultaneously to clean harmful gas components in the exhaust air into harmless carbon dioxide ($CO_2$), water vapor ($H_2O$), and nitrogen ($N_2$).

The exhaust pipe 18 is provided with an exhaust gas recirculation system (hereinafter, "EGR system") 75 that recirculates (refluxes) part of the exhaust air emitted from the engine 10 to the intake pipe 15 (intake system) of the engine 10. The EGR system 75 has an EGR pipe 76 through which the exhaust pipe 18 and the intake pipe 15 of the engine 10 communicate with each other, and an EGR valve 77 that is interposed in the EGR pipe 76 to regulate an exhaust gas recirculation rate (EGR amount).

An opening degree of the EGR valve 77 is controlled (duty-controlled) by the ECU 50. That is, the ECU 50 regulates an opening and closing amount of the EGR valve 77 depending on the operating state of the engine 10 to control a reflux amount (recirculation amount) of the exhaust gas. It is noted that a negative pressure valve or a valve driven by a stepping motor or the like can be used as the EGR valve 77.

Next, the exhaust system 1 will be described. The exhaust system 1 serves to prevent a sensor element from being exposed to condensed water to prevent the sensor element from cracking due to rapid cooling without compromising a sensing performance of an exhaust sensor 19. To this end, the exhaust system 1 is mainly configured with a first communication path 70, an auxiliary chamber 71, a second communication path 72, an ejector 73, a solenoid valve 74, the ECU 50, and the like.

The first communication path (bypass path) 70 communicates with the exhaust pipe (exhaust path) 18 on a downstream side of the turbine 42 and a downstream side of the exhaust emission control catalyst 20. The first communication path 70 communicates with the intake pipe (intake path) 15 on an upstream side of the compressor 41. The exhaust pipe 18 and the intake pipe 15 communicate with each other through the first communication path 70. The first communication path 70 is desirably provided above the exhaust pipe 18. In addition, the first communication path 70 is coupled to the exhaust pipe 18 via the auxiliary chamber 71 having a protrusion shape in an upper portion (upper surface) of the exhaust pipe 18. Suctioning the exhaust air via the auxiliary chamber 71 can inhibit the condensed water from flowing into the first communication path 70 (regulate an inflow amount of the condensed water).

The ejector 73 that generates a negative pressure is interposed in the first communication path 70 near an end portion closer to the intake pipe 15. In one embodiment, ejector 73 may serve as a "negative pressure generator". The second communication path 72 which communicates with the downstream side of the compressor 41 is coupled to the ejector 73. The ejector 73 generates the negative pressure by a pressure difference between the downstream side and an upstream side of the compressor 41 (using a Venturi effect). The negative pressure generated by the ejector 73 helps suction the exhaust air from the exhaust pipe 18 to the first communication path 70.

Figure 2:
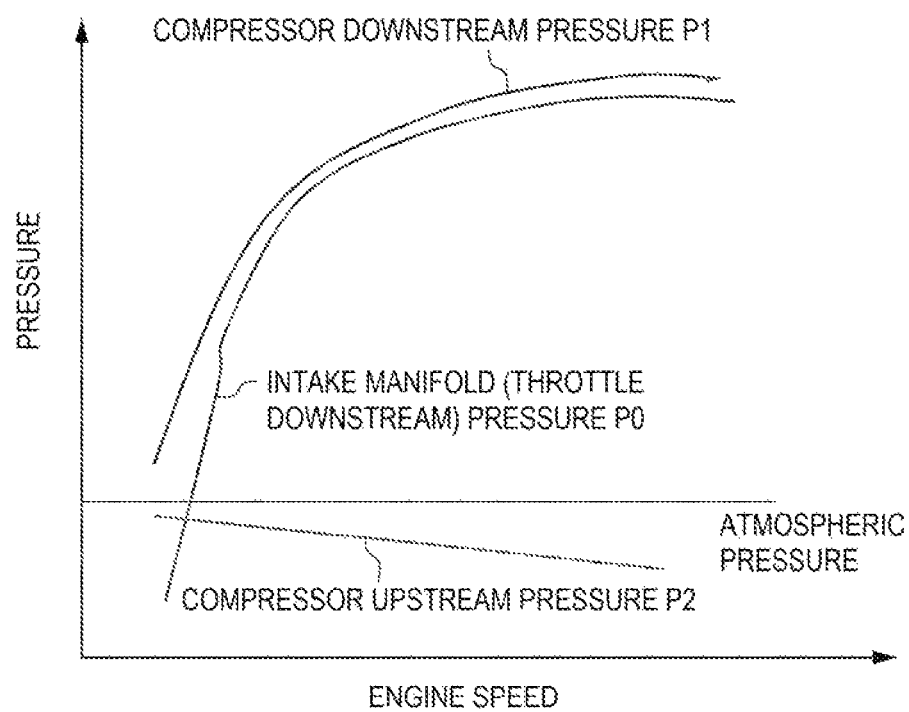
FIG. 2 illustrates a relationship between an engine speed and each of a compressor downstream pressure P1, an intake manifold pressure (throttle downstream pressure) P0, and a compressor upstream pressure P2.

Here, FIG. 2 illustrates a relationship between an engine speed and each of a compressor downstream pressure P1, an intake manifold pressure (throttle downstream pressure) P0, and a compressor upstream pressure P2. The turbocharger 40 revolves (performs supercharging) even in an idling state, and the compressor downstream pressure P1 is higher than an atmospheric pressure and higher than the compressor upstream pressure P2, i.e., (compressor downstream pressure P1)>(compressor upstream pressure P2). Owing to this, the ejector 73 can generate the negative pressure from an idling range (in an entire operating range) to suction the exhaust air (feed the exhaust air to the first communication path 70).

The exhaust sensor 19 is provided (mounted) in the first communication path 70 between a location where the first communication path 70 is coupled to the exhaust pipe 18 and the ejector 73. Therefore, the exhaust sensor 19 detects, for example, a combustion air-fuel ratio from the exhaust air suctioned by the ejector 73 from the exhaust pipe 18 to the first communication path 70.

In the present embodiment, a linear air-fuel ratio sensor (hereinafter, also "LAF sensor") capable of linearly detecting the combustion air-fuel ratio is used as the exhaust sensor 19. The LAF sensor 19 is a sensor that leverages the fact of generating an oxygen ion current in response to an oxygen concentration in the exhaust air when the air-fuel ratio is lean (A/F>14.7) and an oxygen ion current in response to an unburned gas concentration when the air-fuel ratio is rich (A/F<14.7) when a voltage is applied to a heated zirconia solid electrolyte (sensor element), outputting a current value in response to the oxygen concentration or the unburned gas concentration in the exhaust air. The zirconia solid electrolyte (sensor element) is mounted to a tip end of the LAF sensor 19 while being covered with a cylindrical element cover in which multiple through holes are formed. Well-known members can be used as the element cover and the like. It is noted that an O2 sensor or an NOx sensor, for example, detecting the air-fuel ratio by being turned on and off might be used as the exhaust sensor 19.

The solenoid valve (on-off valve) 74 that opens and closes the second communication path 72 is interposed in the second communication path 72 through which the downstream side of the compressor 41 and the ejector 73 communicate with each other. Opening and closing (an opening degree) of the solenoid valve 74 is controlled by the ECU 50. In one embodiment, the ECU 50 may serve as a "control unit".

The ECU 50 controls the opening degree of the solenoid valve 74 so that a flow rate (flow velocity) of the exhaust air flowing in the first communication path 70 does not exceed a predetermined flow rate (flow velocity). In addition, the ECU 50 regulates the opening degree of the EGR valve 77 in response to the amount of the exhaust air recirculated (refluxed) through the first communication path 70, reducing (regulating) the amount of the exhaust air recirculated (refluxed) by the EGR system 75.

Figure 3:
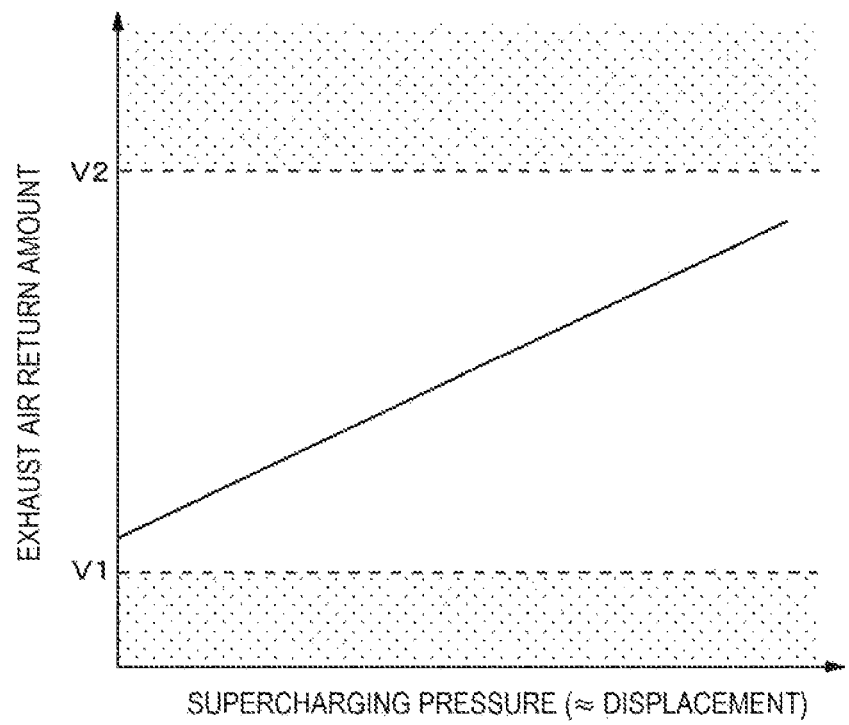
FIG. 3 illustrates a method of setting a flow rate (flow velocity) of a first communication path.
Figure 4:
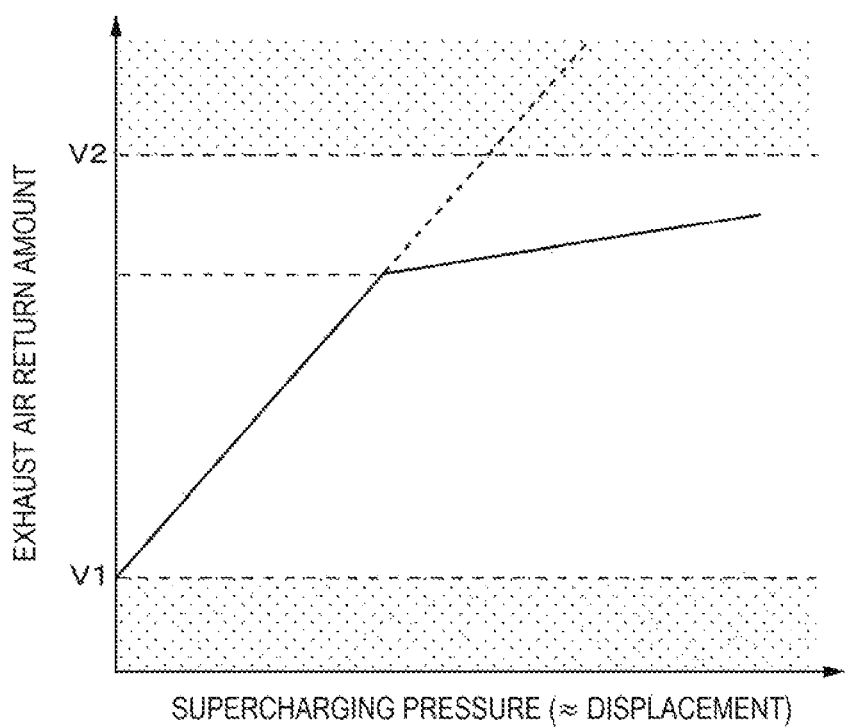
FIG. 4 illustrates the method of setting the flow rate (flow velocity) of the first communication path.

For regulating the amount of the exhaust air flowing in the first communication path 70 (amount of the condensed water), efficiency (a flow rate) of the ejector 73 and a path diameter (pipe diameter) of the first communication path 70 are set. Now, a method of setting the flow rate (flow velocity) of the first communication path 70 will be described with reference to FIGS. 3 and 4. FIGS. 3 and 4 illustrate the method of setting the flow rate (flow velocity) of a first communication path 70. It is noted that a horizontal axis of FIGS. 3 and 4 indicates a supercharging pressure displacement) and a vertical axis indicates an exhaust air return amount (flow rate (flow velocity) of the first communication path 70).

It is assumed that a flow rate (flow velocity) of the exhaust air necessary for the LAF sensor (exhaust sensor) 19 to perform sensing is V1 and that a flow rate (flow velocity) of the exhaust air at which the sensor element is not exposed to the condensed water even when the first communication path 70 is filled with the condensed water 100%, i.e., the condensed water does not enter into the element cover covering the sensor element is V2. The efficiency of the ejector 73 and the path diameter of the first communication path 70 are set so that a relationship of "V1<(flow rate (flow velocity) of first communication path 70)<V2" can be satisfied in an entire operating range. It is noted that with the same flow rate (negative pressure), the flow velocity becomes lower as the path diameter is larger (path is thicker), and the flow velocity becomes faster as the path diameter is smaller (path is thinner). Therefore, once the path diameter is determined, the flow rate and flow velocity of the exhaust gas flowing in the first communication path 70 are proportional to each other.

Here, when the relationship of "V1<(flow rate (flow velocity) of first communication path 70)<V2" can be satisfied in the entire operating range as illustrated in FIG. 3 by setting of the ejector efficiency and the path diameter, the solenoid valve 74 can be omitted (is unnecessary to provide). The path diameter of the first communication path 70 may be set to, for example, approximately a quarter of a pipe diameter of the exhaust pipe 18 so that the exhaust sensor 19 can perform sensing from the idling range and the sensor element can be prevented from exposure to the condensed water.

On the other hand, when the relationship of "V1<(flow rate (flow velocity) of first communication path 70)<V2" is not satisfied in the entire operating range as illustrated in FIG. 4, the solenoid valve 74 is provided to control (inhibit) the flow rate (flow velocity). That is, the opening degree of the solenoid valve 74 is reduced so that the flow rate (flow velocity) does not exceed V2, and the ejector suction amount (flow rate of the exhaust air suctioned by the ejector 73) is reduced.

At that time, the ECU 50 estimates the compressor upstream pressure P2 by computing based on, for example, the engine speed and the supercharging pressure (torque), and controls the sensor (vacuum sensor 30 or the like) to detect the compressor downstream pressure P1 (intake manifold pressure or the like). The ECU 50 then reduces the opening degree of the solenoid valve 74 based on a pressure difference between P1 and P2 (when the pressure difference exceeds a predetermined threshold), controlling (reducing) the negative pressure (i.e., flow rate). For example, a duty solenoid may be appropriately used as the solenoid valve 74.

It is noted that a cam angle sensor that discriminates the cylinders of the engine 10 is provided near the camshaft of the engine 10 in addition to the airflow meter 14, the LAF sensor 19, the vacuum sensor 30, and the throttle opening degree sensor 31 described above. Furthermore, a crank angle sensor 33 that detects a rotational position of the crankshaft 10a of the engine 10 is provided near the crankshaft 10a. For example, electromagnetic pickup sensors may be used as the cam angle sensor and the crank angle sensor 33.

These sensors are coupled to the ECU 50. Various sensors including a water temperature sensor 34 that detects a temperature of cooling water of the engine 10, an oil temperature sensor 35 that detects a temperature of lubricant oil, an accelerator opening degree sensor 36 that detects a depression amount of an accelerator pedal, i.e., an opening degree (operation amount) of the accelerator pedal, and an external temperature sensor 37 that detects an external temperature are also coupled to the ECU 50.

On the other hand, the ECU 50 is coupled to other control units (e.g., a TCU and a VDCU) via, for example, a controller area network (CAN) 100 in a mutually communicable manner.

The ECU 50 is configured with a microprocessor that performs computing, an EEPROM that stores programs and the like for the microprocessor to execute various processing, a RAM that stores various data such as a computing result, a backup RAM that retains a storage content by a battery, an input/output I/F, and the like. The ECU 50 is also configured with an injector driver that drives the injector 12, an output circuit that outputs an ignition signal, a motor driver that drives the electronically controlled throttle valve 13 (electric motor), and the like. The ECU 50 is also configured with a driver and the like driving the solenoid valve 74 and the wastegate valve 44.

The ECU 50 discriminates the cylinders by an output from the cam angle sensor, and obtains the engine speed by an output from the crank angle sensor 33. Furthermore, the ECU 50 obtains various information including the amount of the intake air, the intake pipe negative pressure, the accelerator pedal opening degree, the air-fuel ratio of the air-fuel mixture, the external temperature, and the water temperature and the oil temperature of the engine 10 based on detection signals received from the various sensors described above. The ECU 50 then controls the fuel injection amount, ignition timing, and the various devices including the throttle valve 13 and the wastegate valve 44 based on the obtained various information, controlling the engine 10 comprehensively.

The ECU 50 controls, in particular, the opening degree of the solenoid valve 74 and the opening degree of the EGR valve 77 as described above. That is, the ECU 50 controls the opening degree of the solenoid valve 74 so that the flow rate (flow velocity) of the exhaust air flowing in the first communication path 70 does not exceed the predetermined flow rate (flow velocity) V2. In addition, the ECU 50 regulates the opening degree of the EGR valve 77 in response to the amount of the exhaust air recirculated (refluxed) through the first communication path 70, reducing (regulating) the amount of the exhaust air recirculated (refluxed) by the EGR system 75. Since these control methods are described above, detailed descriptions will not be repeated.

As described in detail, according to the present embodiment, the exhaust pipe 18 and the intake pipe 15 communicate with each other through the first communication path 70, the ejector 73 is interposed in the first communication path 70, the negative pressure is generated to help suction the exhaust air from the exhaust pipe 18 to the first communication path 70, and the LAF sensor (exhaust sensor) 19 is provided in the first communication path 70. Therefore, it is possible to regulate the flow rate (flow velocity) of the exhaust air flowing in the first communication path 70 and prevent the sensor element of the LAF sensor 19 from exposure to the water. As a result, it is possible to prevent the sensor element from being exposed to the condensed water and to prevent the sensor element of the LAF sensor (exhaust sensor) 19 from cracking due to rapid cooling without compromising the sensing performance of the LAF sensor (exhaust sensor) 19.

According to the present embodiment, the ejector 73 that generates the negative pressure by the pressure difference between the downstream side and the upstream side of the compressor 41 is used as the negative pressure generator. Therefore, it is possible to suction the exhaust air from the exhaust pipe 18 (maintain the sensing performance) irrespective of the operating state of the engine 10 (in the entire operating range).

According to the present embodiment, the first communication path 70 is coupled to the exhaust pipe 18 via the auxiliary chamber 71 having the protrusion shape in the upper portion of the exhaust pipe 18. This can inhibit the condensed water from flowing into the first communication path 70 effectively.

According to the present embodiment, the solenoid valve 74 interposed in the second communication path 72 and opening and closing the second communication path 72 is provided, and the opening degree of the solenoid valve 74 is controlled so that the flow rate of the exhaust air flowing in the first communication path 70 does not exceed the predetermined flow rate (V2). Therefore, it is possible to regulate the flow rate (flow velocity) of the exhaust air in the first communication path 70 so that the LAF sensor 19 (sensor element) is not exposed to the water (i.e., the flow rate of the exhaust air does not exceed the flow rate (flow velocity) V2).

According to the present embodiment, the amount of the exhaust air recirculated by the EGR system 75 is reduced depending on the amount of the exhaust air recirculated through the first communication path 70. Therefore, it is possible to prevent degradation of combustion of the engine 10.

While the embodiments of the disclosure have been described, the disclosure is not limited to the embodiments and can be changed and modified variously. For example, the case of applying the disclosure to a gasoline engine vehicle has been described in the embodiment by way of example, the disclosure is also applicable to, for example, a hybrid vehicle (HEV) and a plug-in hybrid vehicle (PHEV) provided with an engine and an electric motor as driving force sources.

Furthermore, while the turbocharger is used as the supercharger 40 in the embodiment, the supercharger is not limited to the turbocharger and may be, for example, a mechanical supercharger.

Moreover, while the valve electrically controlled by the ECU 50 is used as the solenoid valve 74 in the embodiment, a mechanical valve, for example, may be used as an alternative.

The invention claimed is:

1. An exhaust system comprising:
   a supercharger including:
      a turbine provided in an exhaust pipe of an engine; and
      a compressor provided in an intake pipe of the engine, the compressor being coupled to the turbine by a shaft, the supercharger being configured to supercharge intake air using energy of exhaust air;
   an exhaust emission control catalyst provided downstream of the turbine in the exhaust pipe;
   a first communication path that communicates with the exhaust pipe on a downstream side of the exhaust emission control catalyst, the first communication path communicating with the intake pipe on an upstream side of the compressor, the exhaust pipe and the intake pipe communicating with each other through the first communication path;

a negative pressure generator interposed in the first communication path, the negative pressure generator being configured to generate a negative pressure;

an exhaust sensor provided in the first communication path between the negative pressure generator and a location where the first communication path is coupled to the exhaust pipe;

an exhaust gas recirculation (EGR) pipe that communicates with the exhaust pipe on an upstream side of the exhaust emission control catalyst, the EGR pipe communicating with the intake pipe on the upstream side of the compressor, the EGR pipe being provided separately from the first communication path, the exhaust pipe and the intake pipe communicating with each other through the EGR pipe; and an EGR valve interposed in the EGR pipe.

2. The exhaust system according to claim 1, wherein the negative pressure generator is an ejector coupled to a second communication path communicating with a downstream side of the compressor, the ejector being configured to generate the negative pressure by a pressure difference between the downstream side and the upstream side of the compressor.

3. The exhaust system according to claim 2, wherein the first communication path is coupled to the exhaust pipe via an auxiliary chamber having a protrusion shape in an upper portion of the exhaust pipe.

4. The exhaust system according to claim 3, further comprising:

a valve interposed in the second communication path through which the downstream side of the compressor and the negative pressure generator communicate with each other, the valve being configured to open and close the second communication path; and a control unit configured to control opening and closing of the valve, wherein the control unit controls an opening degree of the valve so that a flow rate of the exhaust air flowing in the first communication path does not exceed a predetermined flow rate.

5. The exhaust system according to claim 4, further comprising:

wherein the control unit is configured to control an opening degree of the EGR valve based on an amount of the exhaust air recirculated through the first communication path.

6. The exhaust system according to claim 3, wherein the first communication path is provided above the exhaust pipe.

7. The exhaust system according to claim 4, further comprising:

a vacuum sensor provided downstream of the compressor in the intake pipe and configured to detect a first pressure in a downstream side of the compressor, wherein the control unit is configured to:

calculate a second pressure in the upstream side of the compressor based on an engine speed of the engine and a supercharging pressure of the compressor;

calculate the pressure difference between the downstream side and the upstream side of the compressor based on the first pressure and the second pressure; and when the pressure difference exceeds a predetermined threshold, control the valve to reduce the opening degree of the valve.

8. The exhaust system according to claim 5, further comprising:

a vacuum sensor provided downstream of the compressor in the intake pipe and configured to detect a first pressure in a downstream side of the compressor, wherein the control unit is configured to:

calculate a second pressure in the upstream side of the compressor based on an engine speed of the engine and a supercharging pressure of the compressor;

calculate the pressure difference between the downstream side and the upstream side of the compressor based on the first pressure and the second pressure; and when the pressure difference exceeds a predetermined threshold, control the valve to reduce the opening degree of the valve.

9. The exhaust system according to claim 5, wherein the control unit is configured to control the EGR valve so that an amount of the exhaust air recirculated through the EGR pipe becomes smaller as the amount of the exhaust air recirculated through the first communication path becomes larger.

10. The exhaust system according to claim 8, wherein the control unit is configured to control the EGR valve so that an amount of the exhaust air recirculated through the EGR pipe becomes smaller as the amount of the exhaust air recirculated through the first communication path becomes larger.

11. An exhaust system comprising:

a compressor provided in an intake pipe of an engine;

an exhaust emission control catalyst provided in an exhaust pipe of the engine; a first communication path that communicates with the exhaust pipe on a downstream side of the exhaust emission control catalyst, the first communication path communicating with the intake pipe on an upstream side of the compressor, the exhaust pipe and the intake pipe communicating with each other through the first communication path;

a negative pressure generator interposed in the first communication path, the negative pressure generator being configured to generate a negative pressure;

an exhaust sensor provided in the first communication path between the negative pressure generator and a location where the first communication path is coupled to the exhaust pipe;

an exhaust gas recirculation (EGR) pipe that communicates with the exhaust pipe on an upstream side of the exhaust emission control catalyst, the EGR pipe communicating with the intake pipe on the upstream side of the compressor, the EGR pipe being provided separately from the first communication path, the exhaust pipe and the intake pipe communicating with each other through the EGR pipe; and an EGR valve interposed in the EGR pipe.

12. The exhaust system according to claim 11, wherein the negative pressure generator is an ejector coupled to a second communication path communicating with a downstream side of the compressor, the ejector being configured to generate the negative pressure by a pressure difference between the downstream side and the upstream side of the compressor.

13. The exhaust system according to claim 12, wherein the first communication path is coupled to the exhaust pipe via an auxiliary chamber having a protrusion shape in an upper portion of the exhaust pipe.

14. The exhaust system according to claim 13, further comprising:

a valve interposed in the second communication path through which the downstream side of the compressor and the negative pressure generator communicate with each other, the valve being configured to open and close the second communication path; and a control unit configured to control opening and closing of the valve, wherein the control unit controls an opening degree of the valve so that a flow rate of an exhaust air flowing in the first communication path does not exceed a predetermined flow rate.

15. The exhaust system according to claim 14, wherein the control unit is configured to control an opening degree of the EGR valve based on an amount of the exhaust air recirculated through the first communication path.

16. The exhaust system according to claim 13, wherein the first communication path is provided above the exhaust pipe.

17. The exhaust system according to claim 14, further comprising:

a vacuum sensor provided downstream of the compressor in the intake pipe and configured to detect a first pressure in a downstream side of the compressor, wherein the control unit is configured to:
calculate a second pressure in the upstream side of the compressor based on an engine speed of the engine and a supercharging pressure of the compressor;
calculate the pressure difference between the downstream side and the upstream side of the compressor based on the first pressure and the second pressure; and
when the pressure difference exceeds a predetermined threshold, control the valve to reduce the opening degree of the valve.

18. The exhaust system according to claim 15, further comprising:

a vacuum sensor provided downstream of the compressor in the intake pipe and configured to detect a first pressure in a downstream side of the compressor, wherein the control unit is configured to:
calculate a second pressure in the upstream side of the compressor based on an engine speed of the engine and a supercharging pressure of the compressor;
calculate the pressure difference between the downstream side and the upstream side of the compressor based on the first pressure and the second pressure; and
when the pressure difference exceeds a predetermined threshold, control the valve to reduce the opening degree of the valve.

19. The exhaust system according to claim 15, wherein the control unit is configured to control the EGR valve so that an amount of the exhaust air recirculated through the EGR pipe becomes smaller as the amount of the exhaust air recirculated through the first communication path becomes larger.

20. The exhaust system according to claim 18, wherein the control unit is configured to control the EGR valve so that an amount of the exhaust air recirculated through the EGR pipe becomes smaller as the amount of the exhaust air recirculated through the first communication path becomes larger.

* * * * *